United States Patent Office 2,883,267
Patented Apr. 21, 1959

2,883,267

SYNTHESIS OF SULFUR HEXAFLUORIDE

Earl Leonard Muetterties, Chadds Ford, Pa., assignor to E. I. du Pont de Nemours and Company, Wilmington, Del., a corporation of Delaware No Drawing. Application July 24, 1956
Serial No. 599,707

8 Claims. (Cl. 23—205)

This invention relates to a new process for the preparation of sulfur (VI) fluoride, i.e., sulfur hexafluoride.

Because of its desirable physical and chemical characteristics, and especially its outstanding electrical properties, sulfur hexafluoride is of commercial significance as a gaseous dielectric. At present it is the best overall gaseous dielectric known, particularly for use in transformers.

Sulfur hexafluoride has been usually prepared heretofore by the classical procedure of Moissan or variations thereof involving use of elemental fluorine. While the reaction proceeds satisfactorily, it is obviously undesirable in view of the extremely toxic character of and the difficulty in handling the highly reactive elemental fluorine. In all instances so far reported, these procedures form relatively complex mixtures of the various binary sulfur fluorides, including $SF_4$, $SF_6$, $S_2F_{10}$, and possibly $SF_2$ and $S_2F_2$, which are difficult to separate into their components. Such mixtures must, nevertheless, be carefully resolved since sulfur fluorides other than $SF_6$ have no utility as gaseous dielectrics and are actually harmful therein.

Variations in the basic reaction including substitution for the elemental fluorine of active inorganic fluorides, such as silver (I), copper (I), cobalt (III), silver (II), antimony (III) fluorides, and the like, have also been tried. These variations, while still producing sulfur hexafluoride in reasonable conversions, have likewise resulted in the formation of mixed sulfur fluorides with the concomitant problems mentioned.

A primary object of this invention is, consequently, provision of a novel and useful method for producing sulfur hexafluoride.

A specific object is provision of a method for producing sulfur hexafluoride in such a manner that it can readily be separated from other materials present.

The above-mentioned and still further objects are achieved in accordance with this invention by a process in which sulfur tetrafluoride is pyrolyzed or thermally decomposed in a reaction zone held at a temperature of at least about 500° C. At this temperature and above the tetravalent binary sulfur fluoride, $SF_4$, disproportionates to the hexavalent binary sulfur fluoride, $SF_6$, and elemental sulfur. The reaction may be represented stoichiometrically by the equation:

$$3SF_4 \rightarrow 2SF_6 + S$$

The desired product, $SF_6$, is obtained in admixture with only one other binary sulfur fluoride, unreacted sulfur tetrafluoride. It can be separated easily from this contaminant.

The operational variables important in carrying out this process are those common to gas-phase reactions. In addition to the critical temperature, the principal ones are pressure and contact time. These variables are interrelated to a certain extent and depend somewhat on the manner in which the process is carried out, i.e., batchwise or continuously. The latter mode of operation is preferred because of the ease of control thereof.

The reaction will generally be carried out between about 500° C. and 2000° C. or even higher. The range 500–1500° C. is broadly preferred since it is fairly easily maintained and gives good conversions.

Generally the pressure in batch systems is superatmospheric, most commonly autogenous. The pressure in continuous-flow systems is usually substantially ambient or atmospheric. It will be understood that the terms "substantially ambient" and "substantially atmospheric" include the slight deviations from true atmospheric pressure introduced by the necessary valves and other equipment. Reduced, i.e., subatmospheric, pressure can also be employed. With the low pressures and short contact times used in continuous processes, temperatures for reasonable conversion must be higher than in static systems. Conversely, in the latter type of system, which generally employs the lower temperature ranges, reaction times for appreciable conversion will normally be greater than in the continuous-flow systems.

Preferred conditions for static systems under autogenous pressure include temperatures of from 500° to about 1000° C. for reaction times ranging from a few hours to a few days. A reasonable average contact time for such a system is about 12–24 hours. In continuous-flow systems, contact times will generally vary from as little as 0.001 second or shorter to as long as 5–10 minutes or longer, normally from about 0.1 second to about 60 seconds. Continuous reaction temperatures will range from 800° to 2000° C., preferably from about 900° to 1500° C. or thereabouts.

In continuous-flow systems, higher conversions may be obtained by recycle of the gaseous product through the reaction zone. Since sulfur hexafluoride is substantially unchanged at these temperatures, no deleterious effects will be encountered by repeated recycles. It can, of course, optionally be removed from unreacted sulfur tetrafluoride before recycle.

Any conventional method of supplying the energy necessary for the pyrolysis can be used. Direct external heating is probably the simplest method. The energy can, however, be supplied to the closed reaction zone by internal heat as from a tungsten filament heated by passage of an electrical current. Heat can also be supplied by spark, arc, or discharge techniques. These variations in source of energy supply are recognized in such relatively high temperature reactions and form no part of the invention.

The desired sulfur hexafluoride is obtained by direct distillation from the reaction mixture formed by the pyrolysis. The distillation of the mixture is most conveniently carried out under pressure and at temperatures above the melting point thereof since $SF_6$ sublimes at atmospheric pressure. In practice, the gaseous materials coming from the reaction zone are trapped immediately and directly in cold receivers (e.g., −78° C. or lower) and then fractionated by low temperature distillation. The major components of the reaction product will generally consist of unpyrolyzed sulfur tetrafluoride, the desired sulfur hexafluoride, and contaminants comprising sulfur oxyfluorides ($SO_2F_2$, $SOF_2$), and various fluorocarbons arising from trace amounts of impurities, as will be explained later. In any event, the sulfur hexafluoride can be obtained in desired purity by direct distillation. The unpyrolyzed sulfur tetrafluoride can likewise be recovered and directly recycled through the pyrolysis or reaction zone.

One refinement in procedure may be noted. From the equation given, it is apparent that any method used to remove by-product sulfur from the reaction zone will force the reaction to the right, that is, toward the formation of the desired product. This effect can be achieved by injecting into the reaction zone one or more of the gases oxygen, chlorine or bromine, substantially inert towards both sulfur fluorides concerned. Other than these three elements, the reaction zone must contain as the sole reactant only sulfur tetrafluoride. The quantity of gas added is not critical but preferably should be sufficient to react completely with the sulfur produced.

Several precautions should be taken when carrying out the process of this invention. The reaction vessels defining the reaction zone must, for example, be capable of withstanding pressures generated at the operating temperatures and concentrations involved and must also be fabricated of materials unreactive with the reactant and the product at the temperatures employed. Such materials are well known in the chemical processing art and include metallic platinum. Cheaper equipment may be fabricated from or lined with the commercially available alloy of nickel, iron, and molybdenum known to the trade as "Hastelloy" C.

As another precaution, the reaction must be carried out in a closed system maintained under as anhydrous conditions as possible to avoid side reactions with water. The relatively large proportions of thionyl fluoride, and other contaminants, notably silicon tetrafluoride, reported in the examples which follow, while due in part to adventitious traces of moisture in the reactor system, are believed largely caused by analytical difficulties. When the reaction system is maintained in the closed condition and the product obtained directly, very minor concentrations, if any at all, of the contaminants should exist. The reactant should, of course, also be anhydrous and as pure as possible.

Still furthermore, the reaction zone must be kept free of possible impurities such as carbon. This material frequently is encountered on the surfaces of machined reactors, e.g., from graphite-based lubricants, and must be removed, particularly before use at the higher temperatures. Carbon at elevated temperatures reacts with both sulfur tetrafluoride and sulfur hexafluoride to give fluorocarbons, thereby destroying both the reactant and the desired product (U.S. Patent 2,709,186).

In a preferred embodiment of the invention, embracing the preferred conditions given, anhydrous sulfur tetrafluoride mixed with enough chlorine to react with all elemental sulfur produced is continuously passed at 900–1500° C. and ambient pressure through a clean, inert reactor. The gaseous products and unreacted tetrafluoride are then recirculated through the reaction zone to improve the conversion and finally separated by distillation.

Advantages of this process will be evident. Thus it requires only one simple reactant, sulfur tetrafluoride. Then it produces only one other binary sulfur fluoride, sulfur hexafluoride, easily separated from sulfur tetrafluroide and the other materials involved. The process therefore simplifies the problem of purifying the sulfur hexafluoride.

The following examples in which parts given are by weight are submitted to illustrate the invention further but not to limit it.

*Example I*

A pressure-resistant reaction vessel lined with an alloy of nickel, iron, and molybdenum was charged with about 20 parts of sulfur tetrafluoride. The reactor was sealed and heated at 500° C. for three hours under autogenous pressure. The reactor and its contents were then cooled to room temperature and the gaseous products (about 22 parts) isolated by distillation into a stainless steel cylinder cooled in a solid carbon dioxide/acetone bath. Analysis of a sample of the gaseous product by a mass spectrometer showed it to contain sulfur tetrafluoride and sulfur hexafluoride, primarily the former, as the only binary sulfur fluorides together with small amounts of thionyl fluoride and silicon tetrafluoride. When the reactor was opened, solid sulfur was recovered.

The thionyl fluoride in the gas fraction resulted from adventitious moisture in the reaction system and/or the analytical procedure with resultant hydrolysis of the sulfur tetrafluoride. The silicon tetrafluoride arose through etching of the glass of the mass spectrometer by sulfur tetrafluoride in the presence of water.

*Example II*

A pressure-resistant reaction vessel was charged with about 13 parts of gaseous chlorine and about 20 parts of sulfur tetrafluoride, closed, and heated under autogenous pressure at 500° C. for three hours. The reactor was then cooled to room temperature and the gaseous product removed as in Example I. Mass spectrometric analysis showed $SF_4$ and $SF_6$, primarily the former, as the only binary sulfur fluorides. There were indications of the presence of trace amounts of sulfur trichloride trifluoride, sulfur dichloride tetrafluoride, and sulfur hydride pentafluoride.

*Example III*

As in Example I, a pressure-resistant reaction vessel was charged with about 54.0 parts of anhydrous sulfur tetrafluoride and heated slowly to 500° C. and maintained at this temperature for 18 hours. At the end of this time, the reactor was allowed to cool to room temperature and the gaseous products removed by distillation. When the reactor was opened, a solid product was obtained which by X-ray examination was shown to contain elemental sulfur. Mass spectrometric analysis of the gaseous product showed appreciable quantities of unreacted sulfur tetrafluoride, 7.6 mole percent of sulfur hexafluoride, and no other binary sulfur fluoride. Thionyl fluoride was also present, being formed by a reaction of moisture picked up during the sampling process.

*Example IV*

A platinum-lined nickel tube was heated at 818° C. and 82 parts of gaseous sulfur tetrafluoride was passed therethrough at substantially ambient pressure in a period of 30 minutes. The gases emanating from the reaction zone were immediately condensed in a trap cooled at approximately —78° C. and the products then removed by distillation to a stainless steel cylinder. The approximate contact time was 5 seconds. Mass spectrometric analysis of the gaseous product showed the presence of sulfur tetrafluoride and hexafluoride, mostly the former, and no other binary sulfur fluoride.

*Example V*

A platinum-lined nickel tube was heated at 780° C. and 30 parts of sulfur tetrafluoride and 26 parts of chlorine were passed therethrough in a period of one hour. The gases emanating from the reaction zone were immediately condensed and the products purified by distillation, all as in Example IV. Mass spectrometric analysis of the gaseous products showed the presence of sulfur tetrafluoride and hexafluoride, mostly the former, and no other binary sulfur fluorides. Substantially identical results were obtained in another run varying only in employing a ratio of 40.0/11.0 sulfur tetrafluoride/chlorine for a reaction period of 45 minutes at 750° C.

The embodiments of the invention in which an exclusive property or privilege is claimed are defined as follows:

1. The process which comprises heating substantially anhydrous sulfur tetrafluoride at a temperature of at least about 500° C. for a time sufficient to produce sulfur hexafluoride.

2. The process of claim 1 in which the temperature is about 500–2000° C.

3. The process of claim 1 accomplished in the presence of an oxidant selected from the group consisting of oxygen, chlorine and bromine.

4. The process which comprises heating substantially anhydrous sulfur tetrafluoride in a closed reaction zone at a temperature of about 500–1000° C. and at autogenous pressure for a time sufficient to produce sulfur hexafluoride.

5. In the process of claim 4, the step of supplying to said closed reaction zone an oxidant selected from the group consisting of oxygen, chlorine and bromine.

6. The process which comprises continously passing substantially anhydrous sulfur tetrafluoride through a reaction zone at a temperature of about 800–2000° C. and at a rate to produce sulfur hexafluoride.

7. The process of claim 6 in which the pressure is substantially ambient.

8. In the process of claim 6, the step of supplying to said reaction zone an oxidant selected from the group consisting of oxygen, chlorine and bromine.

References Cited in the file of this patent

UNITED STATES PATENTS

| | | |
|---|---|---|
| 2,462,379 | Gall | Feb. 22, 1949 |
| 2,555,739 | Gall | June 5, 1951 |

OTHER REFERENCES

Schumb: "Preparation and Properties of Sulfur Hexafluoride," Ind. and Eng. Chem., March 1947, pp. 421 to 423.